United States Patent [19]
Onuma

[11] Patent Number: 5,945,906
[45] Date of Patent: Aug. 31, 1999

[54] VEHICLE ANTITHEFT SYSTEM

[75] Inventor: Yoshiki Onuma, Kanagawa, Japan

[73] Assignee: Nissan Motor Co., Ltd., Kanagawa, Japan

[21] Appl. No.: 08/956,132

[22] Filed: Oct. 22, 1997

[30] Foreign Application Priority Data

Oct. 22, 1996 [JP] Japan .................................. 8-279673

[51] Int. Cl.⁶ .................................................. B60Q 1/00
[52] U.S. Cl. ...................... 340/425.5; 340/426; 340/539; 340/825.31; 340/825.34; 307/10.3; 307/10.4; 307/10.5
[58] Field of Search ................................. 307/10.3, 10.4, 307/10.5; 340/426, 505, 539, 825.31, 825.32, 825.34, 825.69, 825.77

[56] References Cited

U.S. PATENT DOCUMENTS 5,650,774  7/1997  Drori .................................. 340/825.32

FOREIGN PATENT DOCUMENTS

| 43 33 474 A1 | 2/1995 | Germany . |
| 44 03 655 A1 | 8/1995 | Germany . |
| 44 07 966 A1 | 9/1995 | Germany . |
| 195 31 219 C1 | 12/1996 | Germany . |
| 64-56253 | 3/1989 | Japan . |
| 8-156743 | 6/1996 | Japan . |

Primary Examiner—Jeffery A. Hofsass
Assistant Examiner—Daryl C. Pope
Attorney, Agent, or Firm—McDermott, Will & Emery

[57] ABSTRACT

A key for a vehicle has a push button, a first transmitter-receiver circuit for transmitting a first ID signal stored in a first memory in response to an ID request signal, and a second transmitter-receiver circuit for transmitting a second ID signal in response to a pressing operation of the push button. An in-car antitheft system has a check circuit for comparing the received first ID signal with a registered ID, and an engine control circuit for inhibiting the operation of an engine if the received ID does not correspond to the registered ID. When the button is pressed for a duration longer than a predetermined length, the second transmitter-receiver circuit of the key transmits the first ID signal in place of the first transmitter-receiver circuit.

27 Claims, 6 Drawing Sheets

VEHICLE ANTITHEFT SYSTEM

The contents of a Patent Application No. 8-279673 with a filing date of Oct. 22, 1996 in Japan are hereby incorporated by reference.

BACKGROUND OF THE INVENTION

The present invention relates to a vehicle antitheft system for deterrence against vehicle theft.

One conventional antitheft system as disclosed in a Japanese Patent Provisional (Kokai) Publication No. 64(1989)-56253 employs an ignition key having therein a transponder for transmitting an ID signal. A vehicle immobilizing system checks the ID signal of the transponder each time the engine is started, and generates a permission signal to permit the engine operation if the received ID is verified, and an inhibition signal to immobilize the vehicle by interrupting the engine operation if it is not.

A keyless entry system on the other hand is designed to enable a driver to enter the vehicle without inserting a key into a keyhole, but simply by pressing a button of the key. The keyless entry system receives an ID signal transmitted from a keyless remote controller formed in the key, and performs door locking or unlocking operations.

In conventional systems, however, a failure of the transponder makes it difficult to continue the engine operation.

SUMMARY OF THE INVENTION

It is an object of the present invention to provide antitheft system and process enabling verification of an ID signal in case of a failure of a transponder.

According to the present invention, an antitheft system comprises a first transmitter for transmitting a first ID signal, a second transmitter for transmitting the first ID signal, a first receiver for receiving the first ID signal transmitted from one of the first and second transmitters, and a first checker for checking whether the first ID signal received by the first receiver corresponds to a first registered signal.

In an illustrated embodiment of the present invention, the first and second transmitters are built in a vehicle remote controller or a vehicle control key such as an ignition key, and the first receiver and the first checker are installed in the vehicle.

DETAILED DESCRIPTION OF THE INVENTION

Figure 1:
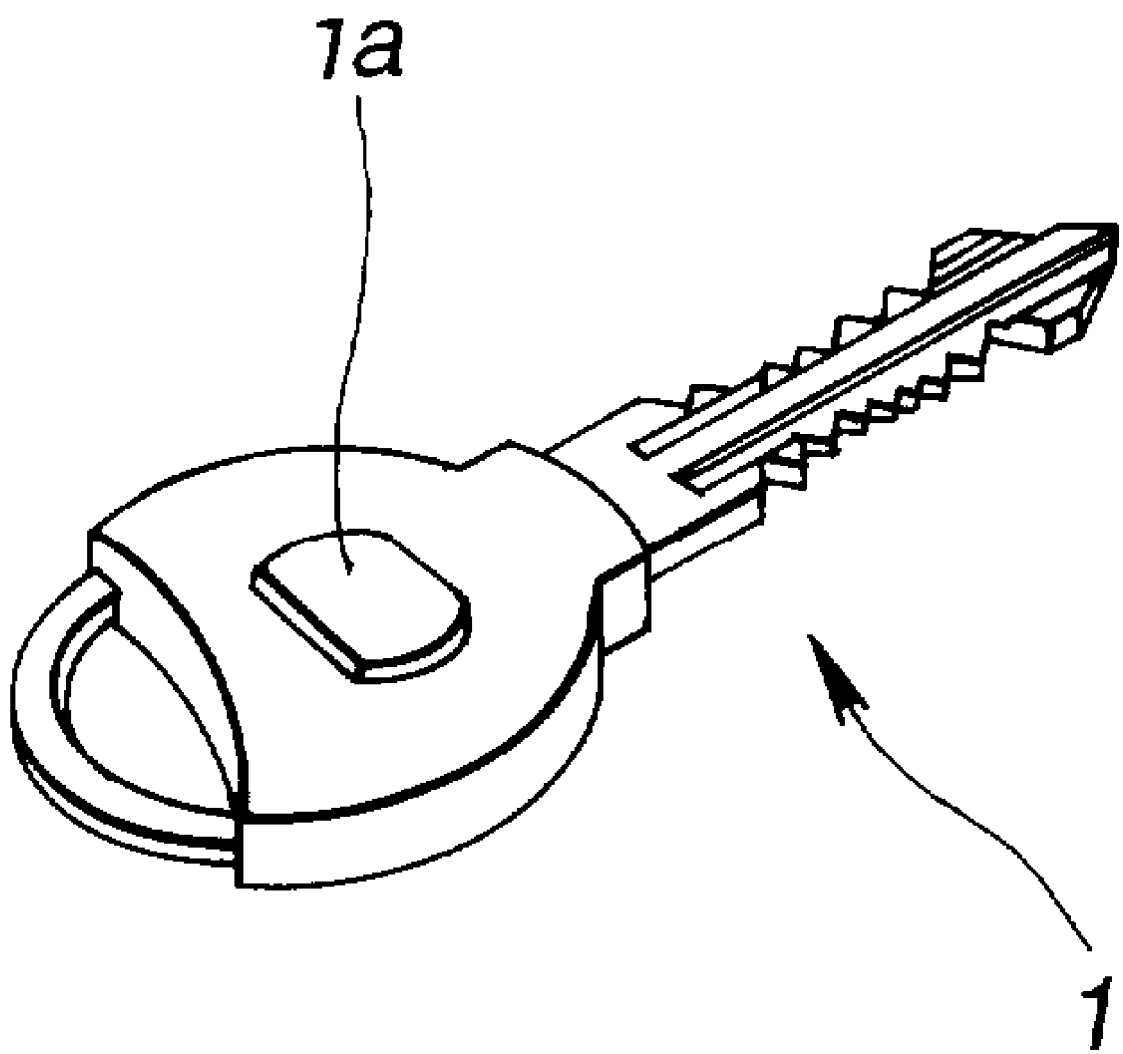
FIG. 1 is a perspective view showing a key according to an embodiment of the present invention.
Figure 2:
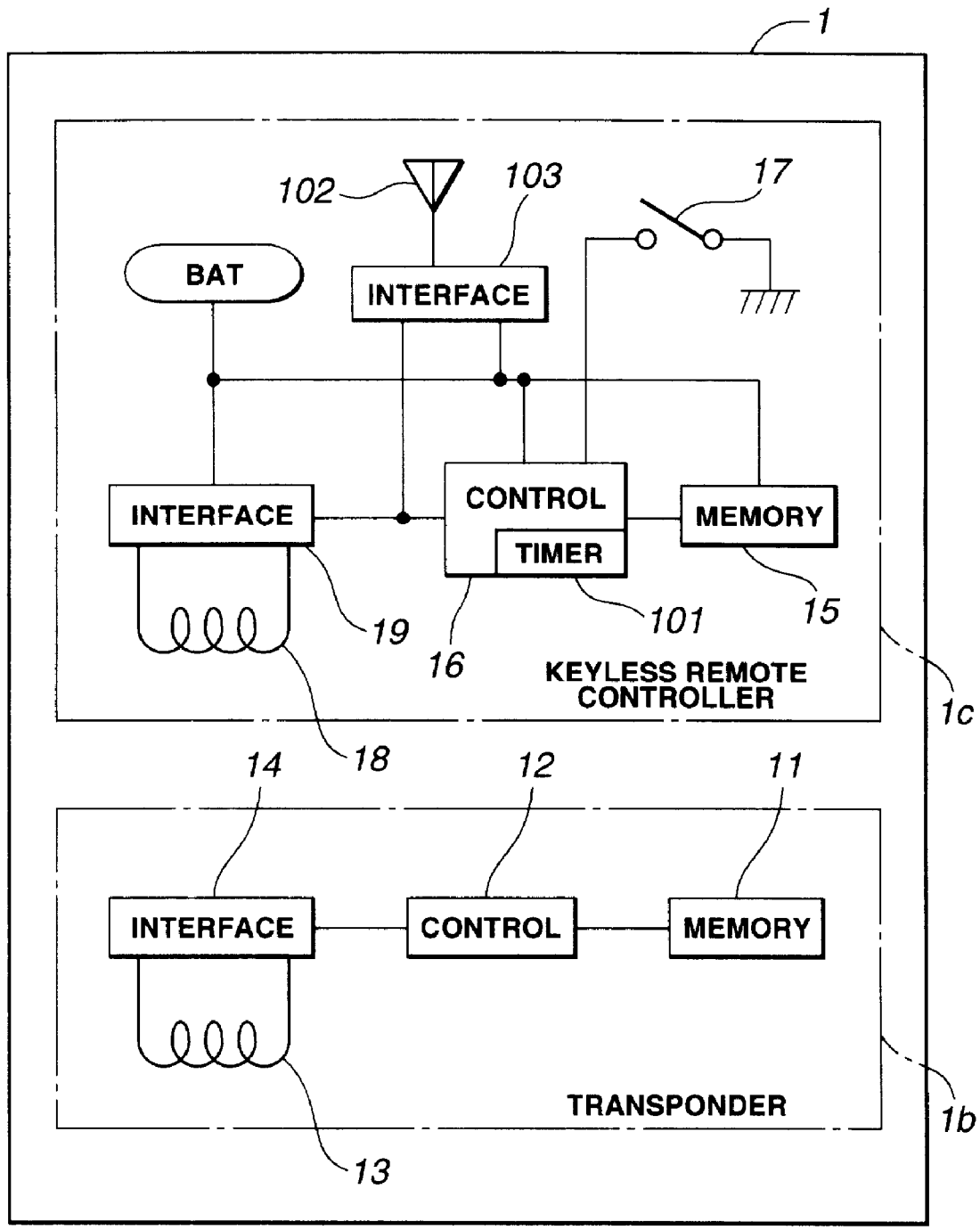
FIG. 2 is a circuit diagram showing a transponder and a keyless remote controller formed in the key of FIG. 1.
Figure 3:
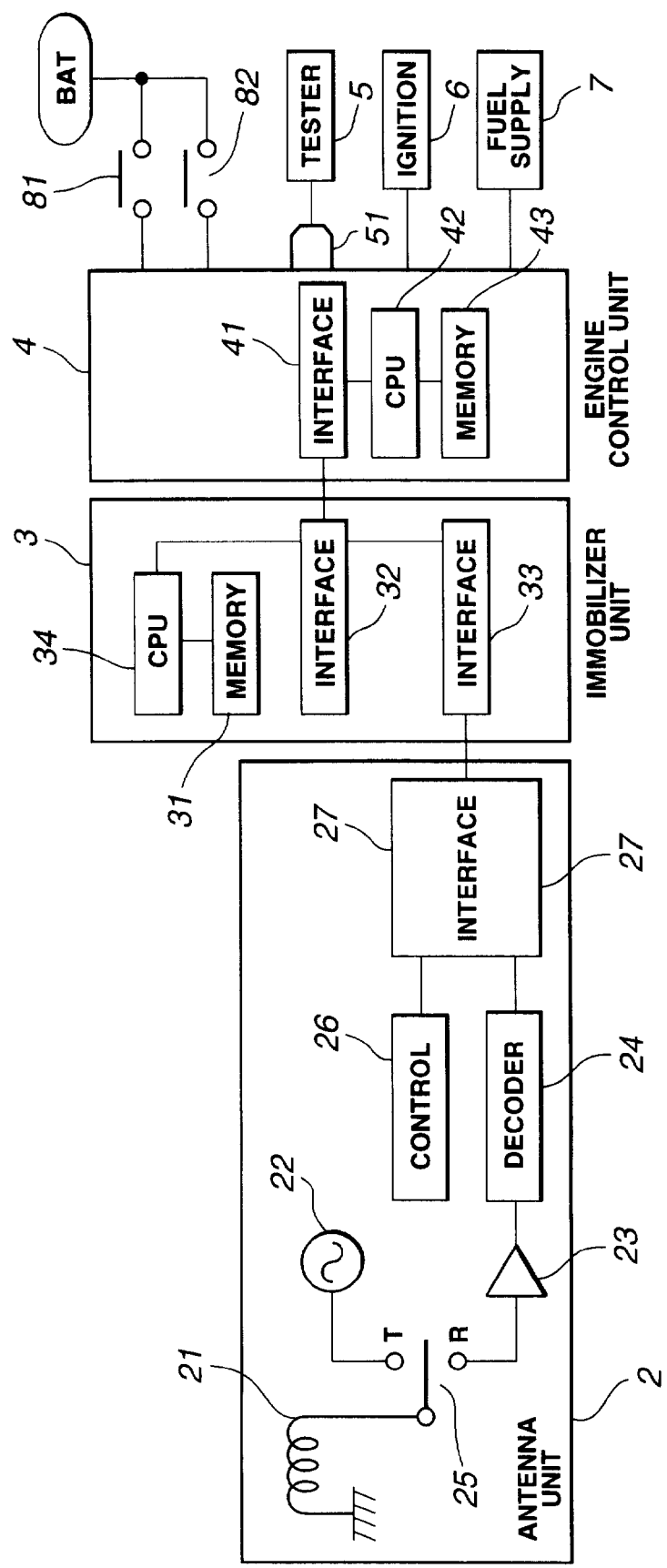
FIG. 3 is an in-car antitheft system according to the embodiment of the present invention.

A vehicle antitheft system according to one embodiment of the present invention comprises at least one key 1 shown in FIGS. 1 and 2, and an immobilizer system shown in FIG. 3. The immobilizer system shown in FIG. 3 includes an antenna unit 2, an immobilizer unit 3, an engine control unit 4, and a self diagnostic tester 5. The tester 5 is detachably connected to the engine control unit 4 by a connector 51. The immobilizer system is installed in the vehicle.

The key 1 has a manual operating button 1a, a transponder 1b and a keyless remote control circuit 1c, as shown in FIGS. 1 and 2. The button 1a is provided in a head of the key 1 as shown in FIG. 1, and the transponder 1b and remote control circuit 1c are built in the key 1. The transponder 1b is designed to transmit a first ID signal or transponder ID signal to the immobilizer system in an engine starting operation to obtain permission for engine operation. The keyless remote control circuit 1c transmits a second ID signal or keyless entry ID signal to allow keyless entry into the vehicle when the manual operating button 1a of the key is pressed. An operator can lock and unlock doors of the vehicle simply by pressing the button 1a.

The transponder 1b shown in FIG. 2 includes a memory (first memory) 11 for storing the transponder ID signal, a control circuit 12 for controlling communication with the antenna unit 2, and an interface 14 for handling communication through an antenna 13 with the antenna unit 2. Each key has its own peculiar transponder ID. The memory 11 is a nonvolatile memory such as EEPROM. The interface 14 has a capacitor. The interface 14 receives a radio pulse signal of a predetermined frequency from the antenna unit 2. The received pulse signal is rectified and stored in the capacitor as energy for transmission of the ID signal. When the pulse signal of the predetermined frequency is received from the antenna unit 2, the control circuit 12 reads the ID from the memory 11 and transmits the ID signal through the interface 14 to the antenna unit 2 of the vehicle by using the energy of the received pulse signal.

The keyless remote control circuit 1c of FIG. 2 includes a memory (second memory) 15, a control circuit 16, a switch 17, an antenna 102, an interface 103 and a battery BAT. The memory 15 stores a keyless entry ID which is peculiar to each key, like the transponder ID. The memory 15 of this example is a nonvolatile memory such as EEPROM. The control circuit 16 controls communication with a keyless entry system mounted on the vehicle. The interface 103 is for transmitting the keyless entry ID signal through the antenna 102 to the in-car keyless entry system.

The control circuit 16 of this example is further configured to transmit the transponder ID signal when the button 1a continues to be pressed. The switch 17 is turned to an on (closed) state when the push button 1a of the key 1 is pressed. The control circuit 101 shown in FIG. 2 has, therein, a timer 101 for measuring an operation time of the button 1a, that is, an on time of the switch 17. The remote control circuit 1c further includes an antenna 18 and an interface 19 for receiving the ID signal from the transponder 1b and transmitting the ID.

The antenna unit 2 is installed in an ignition key cylinder of the vehicle. In this example, the antenna unit 2 includes an antenna 21, an oscillator 22 for generating the pulse signal of the predetermined frequency to be transmitted to the transponder 1b, an amplifier 23 for amplifying a signal received from the transponder 1b, a decoder 24 for decoding the received signal to the transponder ID, a switch 25 for connecting the oscillator 22 with the antenna 21 in the transmitting operation and connecting the amplifier 23 with the antenna 21 in the receiving operation, a control circuit 26 for controlling communication with the transponder 1b under the command of the immobilizer unit 3, and an interface 27 for communicating with the immobilizer unit 3.

The control circuit 26 receives a power transmission command signal from the immobilizer unit 3 through the interface 27. Upon receipt of the power transmission command signal, the control circuit 26 turns the switch 25 to a T side and thereby transmits the power pulse signal of the predetermined frequency generated by the oscillator 22, for a predetermined duration through the antenna 21 to the transponder 1b. This duration of transmission of the power pulse signal is set equal a time length sufficient to store transmitted energy in the interface 14 of the transponder 1b. Then, the antenna unit 2 receives a radio response signal from the transponder 1b by turning the switch 25 to an R side immediately after the transmission, amplifies the response signal with the amplifier 23, and decodes the response signal into the transponder ID with the decoder 24.

The immobilizer unit 3 of FIG. 3 includes a microcomputer 34, a memory 31, interfaces 32 and 33 and other peripheral devices. The immobilizer unit 3 receives a transponder identification request from the engine control unit 4, communicates with the antenna unit 2 through the interface 33 in response to the request, reads the transponder ID of the key 1 through the antenna unit 2, and compares the transponder ID with a registered ID preliminarily registered in the memory 31. The memory 31 of this example is a nonvolatile memory. The immobilizer unit 3 further communicates with the engine control unit 4 through the interface 32, and supplies the result of identification of the transponder ID to the engine control unit 4.

The engine control unit 4 of FIG. 3 includes a microcomputer 42, an interface 41, a memory 43 and other peripheral devices. The engine control unit 4 is arranged to start and stop the engine and control the speed and other operating conditions of the engine by controlling, for example, an ignition system 6 and a fuel supply system 7 of the engine. Furthermore, the engine control unit 4 communicates with the immobilizer unit 3 through the interface 41, requests the identification of the transponder ID and receives the result of the identification. If the signal from the immobilizer unit 3 indicates a disagreement between the transponder ID and the registered signal, the engine control unit 4 stops the engine by ceasing the operations of the ignition system 6 and the fuel supply system 7.

Switches 81 and 82 are connected with the engine control unit 4, The switch 81 is closed when the key 1 is put in a start position ST for starting the engine. The switch 82 is closed when the key 1 is put in an on position ON for operating the engine, or in the start position ST.

The self diagnostic tester 5 is connected with the engine control unit 4 by the connector 51 for allowing disconnection of the tester 5 from the control unit 4. The tester 5 is designed to perform an initializing operation in case of replacement of the immobilizer unit 3 or the engine control unit 4.

In this example, the communication between the immobilizer unit 3 and the engine control unit 4 is as follows:

(1) Request for Identification

When the switch 81 is closed by an engine starting operation with the key 1, the engine control unit 4 starts the engine by actuating the ignition system 6, the fuel supply system 7 and a starter motor, and delivers the identification request signal to the immobilizer unit 3.

(2) Identification

Upon receipt of the identification request signal from the engine control unit 4, the immobilizer unit 3 reads the transponder ID signal from the transponder 1b of the key 1 through the antenna unit 2, and examines the received ID signal to determine whether the received ID is in agreement with the registered ID stored in the memory 31. The immobilizer unit 3 sends, to the engine control unit 4, an agreement signal when the received ID is in agreement with the registered ID, and a disagreement signal when it is not.

(3) Action after Identification

When the disagreement signal is received from the immobilizer unit 3, the engine control unit 4 stops the engine immediately by terminating the operations of the ignition system 6 and the fuel supply system 7.

When the agreement signal is received, the engine control unit 4 further checks if the immobilizer unit 3 is an authorized correct one or not, in the following manner. Thus, the engine control unit 4 verifies the authenticity of the immobilizer unit 3 before permitting the engine operation.

(4) Request for Rolling Code

When the engine control unit 4 receives the agreement signal from the immobilizer unit 3, the engine control unit 4 further requests the immobilizer unit 3 to send a rolling code. The rolling code is an identification code changed each time the engine is stopped. In each stoppage of the engine, the engine control unit 4 sets the rolling code and sends the rolling code to the immobilizer unit 3, and the immobilizer unit 3 stores the rolling code in the memory 31.

(5) Transmission of Rolling Code

In response to the request signal for the rolling code from the engine control unit 4, the immobilizer unit 3 transmits the rolling code received from the engine control unit 4 and stored in the memory 31 in the last stoppage of the engine.

(6) Receipt of Rolling Code

The engine control unit 4 receives the rolling code from the immobilizer unit 3, and compares the received rolling code with the rolling code which the engine control unit 4 sent to the immobilizer unit 3 in the last stoppage of the engine. If both codes agree with each other, the engine control unit 4 judges the immobilizer unit 3 to be authentic, and grants permission for engine operation. In the case of disagreement, the antitheft system judges that either or both of the immobilizer unit 3 and the engine control unit 4 is an unauthorized replacement, and immediately immobilizes the vehicle by stopping the ignition system 6 and the fuel supply system 7, thereby stopping the engine, and by inhibiting an engine starting operation of the starter.

The permission for engine operation is not an act to allow the engine to start, but an act for enabling the engine to continue its operation. The disagreement signal is a signal to stop the engine, not a signal to inhibit a start of the engine. When the engine is inoperative, the disagreement signal does not inhibit a starting operation of the engine.

The permission for engine start is an act to enable the engine to start, and the inhibition against engine start is an act to inhibit the engine from being started. The permission for engine start and the inhibition from engine start are ineffective for the engine which is already in operation.

In this embodiment, the transponder ID is stored in the memory 15 of the keyless remote control circuit 1c, and the key 1 enables the driver to start the engine by transmitting the transponder ID with the keyless remote control circuit 1C even if the transponder 1b becomes unable to transmit the transponder ID because of some failure.

The antitheft system of this example writes the transponder ID into the memory 15 of the remote control circuit 1c in the following manner. In the normal state of the transponder 1b, the antitheft system writes the transponder ID into the memory 15 if the user performs predetermines operations, and the transponder ID is not yet stored in the memory 15. The predetermined operations are as follows: While holding the button 1a pressed, the user inserts the key 1 into the key cylinder of the vehicle, and performs an engine starting operation. Thereafter, the user holds the button 1a pressed for a time equal to or longer than a predetermined time length (N seconds). If the transponder ID is not stored in the memory 15, and these operations are performed, then the control circuit 16 intercepts the transponder ID transmitted from the transponder 1b to the antenna unit 2, with the antenna 18, and writes the transponder ID in the memory 15. The remote control circuit 1c performs the writing operation of the transponder ID only once. Once the transponder ID is written into the memory 15, the remote control circuit 1c does not perform the writing operation of the transponder ID even if the predetermined operations are performed. The predetermined time length (N seconds) is set equal to several seconds. The predetermined time length is long enough to draw a distinction from the keyless entry operation, but the predetermined time length should not be too long so as not to bother the operator.

When the button 1a of the key 1 is pressed, the keyless remote control circuit 1c performs the function of the keyless entry or the function of the transponder in dependence of the length of the operation time of the button 1a. If the operation time during which the button 1a remains pressed is shorter than the predetermined time length (N seconds), then the remote control circuit 1c performs the function of the keyless entry. In this case, the control circuit 16 reads the keyless entry ID from the memory 15, and transmits the keyless entry ID to the keyless entry system of the vehicle. The keyless entry system receives the keyless entry ID signal from the key 1, and compares the received keyless entry ID with the register ID. The keyless entry system locks all the doors of the vehicle if the keyless entry ID is in agreement with the registered ID and any one or more of the doors is in the unlocked state. The keyless entry system unlocks all the doors if the keyless entry ID is in agreement and all the doors are in the locked state.

If the operation time is equal to or longer than the predetermined time length (of N seconds), the keyless remote control circuit 1c carries out the antitheft function in place of the transponder 1b. That is, the remote control circuit 1c reads the transponder ID from the memory 15, and transmits the transponder ID through the interface 19 and antenna 18 to the antenna unit 2.

Figure 4:
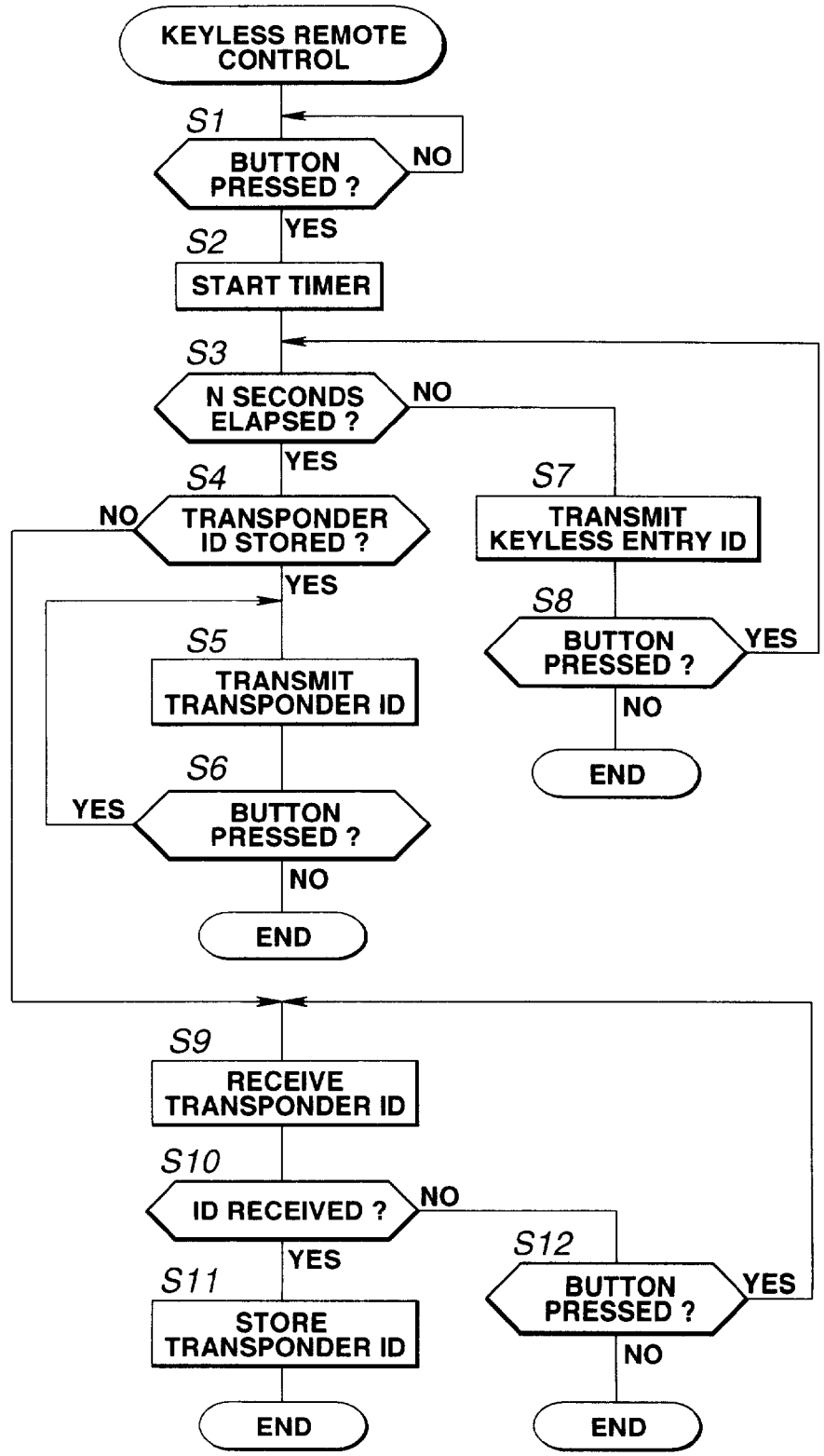
FIG. 4 is a flowchart showing a keyless remote control process performed by the remote controller of FIG. 2.
Figure 5:
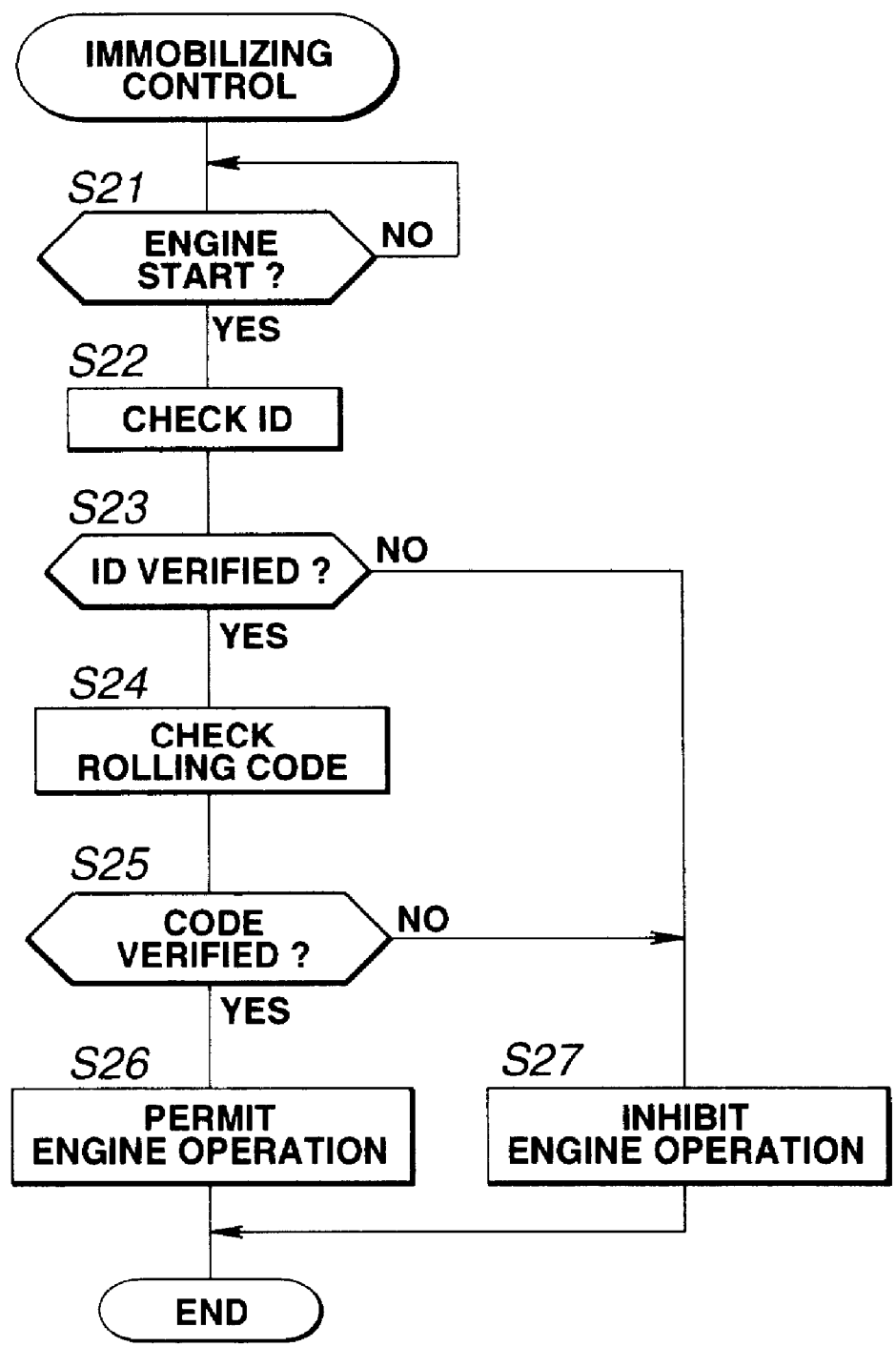
FIG. 5 is a flowchart showing a vehicle immobilizing process performed by the antitheft system of FIG. 3.

FIGS. 4 and 5 show an antitheft control process according to this embodiment of the present invention.

FIG. 4 is a flowchart showing a keyless remote control process. The control circuit 16 of the keyless remote control circuit 1c carries out the process of FIG. 4 when the switch 17 is closed by a manual pressing operation of the operating button 1a.

The control circuit 16 in the key 1 checks if the button 1a is pressed or not at a step S1, and proceeds to a step S2 if the button 1a is pressed and hence the switch 17 is closed. At the step S2, the control circuit 16 resets the timer 101 and starts the timer 101. The timer 101 starts measuring a pressing operation time during which the button 1a continues to be pressed, and the switch 17 continues to be on.

At a step S3 following the step S2, the control circuit 16 determines whether the elapsed time from the start of the pressing operation of the button 1a is equal to or greater than a predetermined time interval (N seconds). From the step S3, the control circuit 16 proceeds to a step S4 if the elapsed time is equal to or greater than N, and to a step S5 if the elapsed time is shorter than N.

When the time of the pressing operation becomes equal to or greater than the predetermined interval N, the control circuit 16 checks whether the transponder ID is already stored in the memory 15. From the step S4, the control circuit 16 proceeds to a step S5 if the transponder ID is stored in the memory 15, and to a step S9 if it is not. At the step S5, the control circuit 16 reads the transponder ID from the memory 15, and transmits the transponder ID through the interface 19 from the antenna 18. At a next step S6, the control circuit 16 checks whether the button 1a remains pressed. If the button 1a is still pressed, the control circuit 16 returns to the step S5 and continues transmitting the transponder ID. If the button 1a is no longer pressed, the control circuit 16 terminates the process.

When the time of the pressing operation is shorter than the predetermined interval N, the control circuit 16 reads the keyless entry ID from the memory 15 and transmits the ID through the interface 103 from the antenna 102 at the step S7. The keyless entry system of the vehicle receives the keyless entry ID signal, and carries out the keyless entry control process as mentioned before. The control circuit 16 checks whether the button 1a remains pressed, at a step S8 following the step S7. The control circuit 16 returns to the step S3 if the button 1a is pressed, and terminates the process if it is not.

If the operation time of the button 1a is equal to or longer than the predetermined interval N, and the transponder ID is not yet stored in the memory 15, then the control circuit 16 proceeds from the step S4 to the step S9, and performs a transponder ID writing operation in the following manner. The control circuit 16 starts an operation for receiving the transponder ID at the step S9, examines whether the transponder ID is received, at a step S10, and proceeds to a step S11 if the transponder ID is received. At the step S11, the control circuit 16 stores the received transponder ID in the memory 15 by setting an N flag, and making the memory 15 in a writable state. After the writing operation, the control circuit 16 resets the N flag and thereby inhibits a writing operation. If the transponder ID is not received, the control circuit 16 proceeds from the step S10 to a step S12, and examines, at the step S12, whether the button 1a is still pressed. Then, the control circuit 16 returns to the step S9 and continues the transponder ID receiving operation if the button 1a remains pressed, and terminates the process if the button 1a is not pressed.

FIG. 5 shows an antitheft immobilizing control process of the immobilizing system of the immobilizer unit 3 and the engine control unit 4.

At a step S21, the engine control unit 4 checks the switch 81 to determine whether the engine is started. If an engine starting operation is detected, the engine control unit 4 proceeds to a step S22, and requests the immobilizer unit 3 to check the ID of the key 1 used to start the engine. In response to this request for identification from the engine control unit 4, the immobilizer unit 3 receives the transponder ID from the key 1 with the antenna unit 2 and compares the received transponder ID with the registered ID.

When the transponder 1b in the key 1 is in a normal condition capable of functioning properly, the transponder 1b transmits the transponder ID by using the energy transmitted from the antenna unit 2.

When the transponder 1b is incapable of functioning properly because of a failure, the transponder 1b cannot transmit the transponder ID, and the antitheft system inhibits the engine operation, and stops the engine. After repetition of unsuccessful attempt, the driver notices a failure of the transponder 1b, and tries the engine starting operation while holding the button 1a pressed. When the button 1a is held pressed for a time equal to or longer than the predetermined time length (of N seconds), the keyless remote control circuit 1c transmits the transponder ID, and the antenna unit 2 receives the transmitted ID signal. However, the keyless remote control circuit 1c does not transmit the transponder ID if the transponder ID is not stored in the circuit 1c.

The antitheft immobilizing system checks, at a step S23, whether the transponder ID used to start the engine is in agreement with the registered ID, and proceeds to a step S24 if they are in agreement. At the step S24, the engine control unit 4 requests the immobilizer unit 3 to send the rolling code, and receives the rolling code from the immobilizer unit 3. Then, the engine control unit 4 examines whether the received rolling code agrees with the rolling code sent to the immobilizer unit 3 in the most recent stoppage of the engine. If an agreement is confirmed at a step S25, the antitheft system proceeds to a step S26, and permits the engine operation. If the examination of the transponder ID or the examination of the rolling code provides a result of disagreement, the engine control unit 4 terminates the operations of the ignition system 6 and the fuel supply system 7 and inhibits the operation of the engine at a step S27.

In the thus-constructed antitheft system, the keyless remote control circuit 1c backs up the transponder 1b, and performs the ID transmitting function of the transponder 1b in case of failure of the transponder 1b. Therefore, the driver can continue the engine operation. A vehicle control key such as an ignition key according to the present invention fulfils three functions. The keyless remote control circuit 1c normally performs the keyless entry function, and the transponder 1b normally performs the antitheft immobilizing function. In addition, the keyless remote control circuit 1c functions as a fail-safe means for transmitting the transponder ID in lieu of the transponder 1b.

In the illustrated example, the memory 15 of the keyless remote control circuit 1c and the memory 11 of the transponder 1b are both nonvolatile. Therefore, the memories 11 and 15 can retain information on the IDs in the absence of power.

Figure 6:
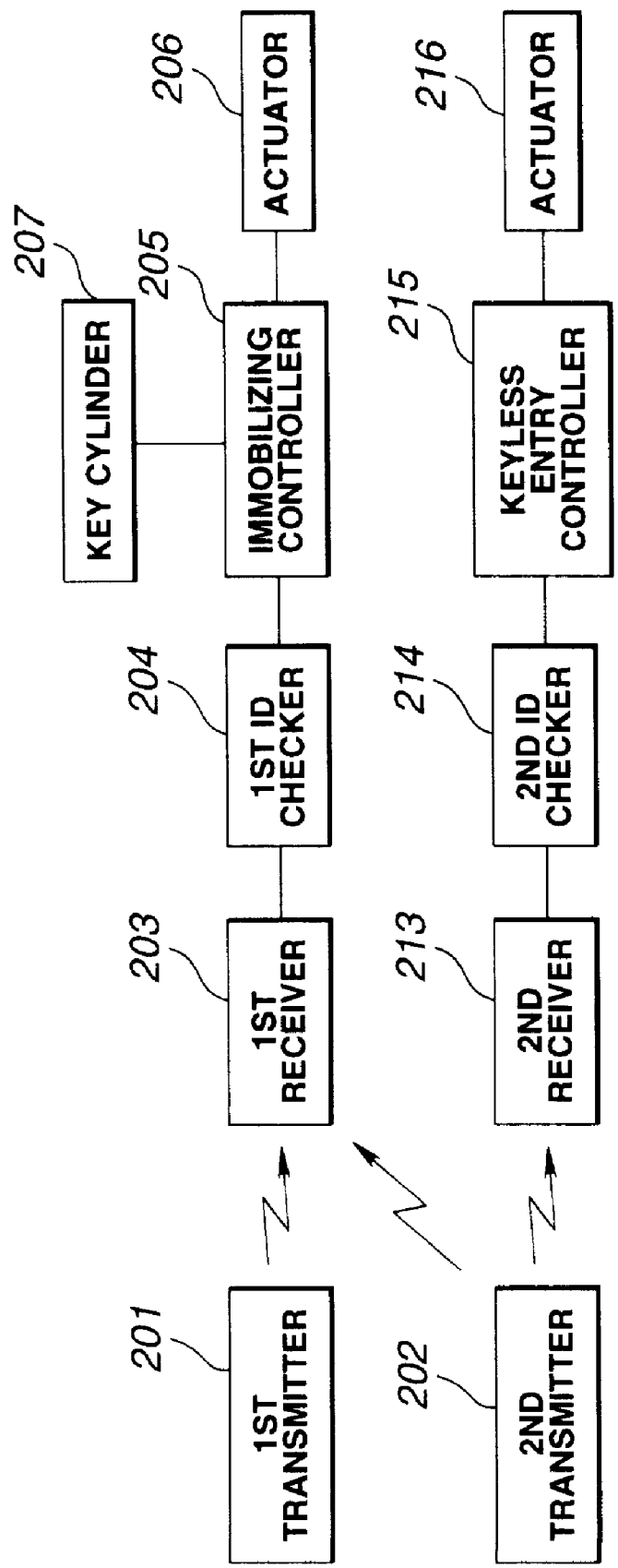
FIG. 6 is a block diagram showing a combination of an immobilizing system and a keyless entry system according to the present invention.

FIG. 6 schematically illustrates a keyless entry system which can be employed in the antitheft system according to the embodiment shown in FIGS. 1~5. In the example of FIG. 6, each of the vehicle immobilizing system and the keyless entry system includes a receiver 203 or 213, an ID checker 204 or 214 and a controller 205 or 215. The antitheft system of FIG. 6 further includes a vehicle control key such as the key 1 of FIGS. 1 and 2. The vehicle control key of FIG. 6 comprises first and second transmitter sections 201 and 202. According to one of possible interpretations, the sections 201~205 correspond, respectively, to the transponder 1b, the remote control circuit 1c, the antenna unit 2, the immobilizer unit 3 and the engine control unit 4 shown in FIGS. 2 and 3. When the key such as the ignition key is operated in a key cylinder 207 to start a prime mover of the vehicle, the first ID checker 204 of the immobilizing system obtains a first ID signal, such as the transponder ID signal, from the first transmitter section 201 of the key through the first receiver section 203 and checks the received ID. If the ID represented by the received signal does not match a registered ID, the immobilizing controller section 205 immobilizes the vehicle with an actuator 206 for enabling and disabling the movement of the vehicle. The actuator 206 may be in the form of any one or more of the ignition system, fuel supply system and starter motor.

The key further has a manually operated device such as the button 1a of FIG. 1, and the second transmitter 202 transmits a second ID signal such as the keyless entry ID signal in response to a manual operation of the manual device of the key. The second receiver section 213 receives the second ID signal, the second checker section 214 compares the second ID signal received by the second receiver with a second registered signal, and the keyless entry controller section 215 allows a door locking or unlocking operation in response to an agreement signal from the second checker section 214 indicating an agreement between the second ID signal and the second registered signal. The keyless entry controller section 215 controls one or more door lock actuators 216.

What is claimed is:

1. An antitheft system comprising:
    a first transmitter for transmitting a first ID signal;
    a second transmitter for transmitting the first ID signal;
    a first receiver for receiving the first ID signal transmitted from one of the first and second transmitters; and
    a first checker for checking whether the first ID signal received by the first receiver corresponds to a first registered signal, wherein
        the first transmitter comprises a first memory for storing the first ID signal, and transmits the first ID signal stored in the first memory,
        the second transmitter comprises a second memory for storing the first ID signal, and transmits the first ID signal stored in the second memory, and
        the second transmitter further comprises a control section for transmitting a second ID signal in a first control mode, for storing the first ID signal into the second memory in a second control mode, and for transmitting the first ID signal stored in the second memory in a third control mode.

2. An antitheft system as claimed in claim 1 wherein the first and second transmitters are components of a single hand held unit, the second transmitter further comprises an antenna for receiving the first ID signal and a receiving circuit for causing the control section of the second transmitter to store the first ID signal into the second memory in the second control mode.

3. An antitheft system as claimed in claim 2 wherein the first transmitter is a transponder for automatically transmitting the first ID signal upon reception of a predetermined interrogating trigger signal.

4. An antitheft system for a vehicle, comprising:
    a key comprising a first transmitter for transmitting a first ID signal, and a second transmitter for transmitting a second ID signal and the first ID signal; and
    a first receiver for receiving the first ID signal transmitted from one of the first and second transmitters of the key;
    a first checker, mounted on the vehicle, for comparing the first ID signal received by the first receiver with a first registered signal;
    an immobilizing controller for controlling an engine of the vehicle in dependence on a result of comparison by the first checker;
    a second receiver for receiving the second ID signal;
    a second checker for comparing the second ID signal received by the second receiver with a second registered signal; and
    a keyless entry controller for enabling a door lock in response to an agreement signal from the second checker indicating an agreement between the second ID signal and the second registered signal.

5. An antitheft system as claimed in claim 4 wherein the immobilizing controller renders the engine operable when the first ID signal received by the first receiver is in agreement with the first registered signal.

6. An antitheft system as claimed in claim 4 wherein the immobilizing controller renders the engine inoperable when the first ID signal received by the first receiver is in disagreement with the first registered signal.

7. An antitheft system as claimed in claim 3 wherein the first transmitter comprises a first memory for storing the first ID signal, and a first control section for reading the first ID signal from the first memory and transmitting the first ID signal, and wherein the second transmitter comprises a second memory for storing the first ID signal, and a second control section for reading the first ID signal from the second memory and transmitting the first ID signal.

8. An antitheft system as claimed in claim 4 wherein
the system comprises a trigger transmitter for transmitting a trigger signal by radio to the first transmitters, and
the first transmitter is a transponder for receiving the trigger signal by radio from the trigger transmitter and transmitting the first ID signal upon receipt of the trigger signal.

9. An antitheft system as claimed in claim 8 wherein the trigger transmitter is connected with a key switch operated by the key, and transmits the trigger signal in response to a predetermined starting operation of the key switch by the key.

10. An antitheft system, comprising:
a key comprising a first transmitter for transmitting a first ID signal, and a second transmitter for transmitting a second ID signal and the first ID signal;
a first receiver for receiving the first ID signal transmitted from one of the first and second transmitters of the key;
a first checker, mounted on the vehicle, for comparing the first ID signal received by the first receiver with a first registered signal; and
an immobilizing controller for controlling an engine of the vehicle in dependence on a result of comparison by the first checker, wherein
the key includes a manually operated device, a timer for measuring an operation time of the manually operated device, and
the second transmitter transmits the first ID signal when the time measured by the timer is equal to or longer than a predetermined time length.

11. An antitheft system, comprising:
a key comprising a first transmitter for transmitting a first ID signal, and a second transmitter for transmitting a second ID signal and the first ID signal;
a first receiver for receiving the first ID signal transmitted from one of the first and second transmitters of the key;
a first checker, mounted on the vehicle, for comparing the first ID signal received by the first receiver with a first registered signal; and
an immobilizing controller for controlling an engine of the vehicle in dependence on a result of comparison by the first checker, wherein
the first transmitter comprises a first memory for storing the first ID signal, and a first control section for reading the first ID signal from the first memory and transmitting the first ID signal,
the second transmitter comprises a second memory for storing the first ID signal and a second control section for reading the first ID signal from the second memory and transmitting the first ID signal
the a key comprises a manual device,
the second transmitter of the key transmits a second ID signal in response to a manual operation of the manual device of the key and thereafter transmits the first ID signal, and
the antitheft system further comprises a second receiver for receiving the second ID signal, a second checker for comparing the second ID signal received by the second receiver with a second registered signal, and a keyless entry controller for enabling a door lock in response to an agreement signal from the second checker indicating an agreement between the second ID signal and the second registered signal.

12. An antitheft system as claimed in claim 11 wherein the key further comprises a timer for measuring an operation time of the manual device; and wherein the second transmitter transmits the first ID signal stored in the second memory when the time measured by the timer is equal to or longer than a predetermined time length.

13. An antitheft system as claimed in claim 11 wherein the second transmitter comprises a third memory for storing the second ID signal, and the second transmitter transmits the second ID signal stored in the third memory when the time measured by the timer is shorter than the predetermined time length.

14. An antitheft system as claimed in claim 12 wherein the second control section of the second transmitter stores the first ID signal in the second memory if the time measured by the timer is equal to or longer than the predetermined time length, the first ID signal from the first transmitter is received, and the first ID signal is not stored in the second memory.

15. An antitheft system as claimed in claim 13 wherein each of the first, second and third memories is a nonvolatile memory.

16. A key for a vehicle equipped with an antitheft system, the key comprising:
a first transmitter for transmitting a first ID signal to the vehicle for performing a first function in the vehicle; and
a second transmitter for transmitting a second ID signal to the vehicle for performing a second function in the vehicle, different from the first function, when the second transmitter is in a normal mode, said second transmitter further transmitting the first ID signal in lieu of the first transmitter when the second transmitter is in a fail safe mode.

17. A key as claimed in claim 16 wherein the key further comprises a manual device, and wherein, when the manual device is operated, the second transmitter transmits a second ID signal, and thereafter transmits the first ID signal.

18. A key as claimed in claim 16 wherein the first transmitter comprises a first memory for storing the first ID signal, and the second transmitter comprises a second memory for storing the first ID signal and the second ID signal and a control section for transmitting the second ID signal in the normal mode, for storing the first ID signal into the second memory in a writing mode, and for transmitting the first ID signal stored in the second memory in the fail safe mode.

19. A key as claimed in claim 16 wherein the second transmitter comprises an antenna for receiving the first ID signal and a receiving circuit for causing the control section of the second transmitter to store the first ID signal into the second memory in the writing mode.

20. A key as claimed in claim 19 wherein the first transmitter is a transponder for automatically transmitting the first ID signal upon reception of a predetermined interrogating trigger signal.

21. A key as claimed in claim 19 wherein the key further comprises a notched portion adapted to be inserted into a key hole of the vehicle to start a prime mover of the vehicle.

22. A key for a vehicle equipped with an antitheft system, the key comprising:

a first transmitter for transmitting a first ID signal;

a second transmitter for transmitting;

a manual device, wherein, when the manual device is operated, the second transmitter transmits a second ID signal, and thereafter transmits the first ID signal; and a timer for measuring an operation time of the manual device, wherein the second transmitter transmits the second ID signal when the time measured by the timer is shorter than a predetermined time length, and transmits the first ID signal when the time measured by the timer is equal to or longer than the predetermined time length.

23. A key as claimed in claim 22 wherein the first transmitter comprises a first memory for storing the first ID signal, and transmits the first ID signal stored in the first memory, and the second transmitter comprises a second memory for storing the first ID signal and the second ID signal, and the second transmitter transmits the second ID signal stored in the second memory when the time measured by the time is shorter than the predetermined time length, and transmits the first ID signal stored in the second memory when the time measured by the time is equal to or longer than the predetermined time length.

24. A key as claimed in claim 23 wherein the key comprises a controller for storing the first ID signal in the second memory if the time measured by the timer is equal to or longer than the predetermined time length, the first ID signal from the first transmitter is received, and the first ID signal is not stored in the second memory.

25. An antitheft process comprising the steps of:

transmitting a first ID signal with a first transmitter;

transmitting a second ID signal with a second transmitter when a condition discrimination signal is in a first signal state, and transmitting the first ID signal instead of the second ID signal with the second transmitter when the condition discrimination signal is in a second signal state;

receiving the first ID signal transmitted from one of the first and second transmitters;

comparing the first ID signal received by the receiving step with a first registered signal; and rendering an engine operable when the first ID signal received by the receiving step is in agreement with the registered signal.

26. An antitheft process comprising the steps of:

transmitting a first ID signal with a first transmitter;

transmitting the first ID signal with a second transmitter;

receiving the first ID signal transmitted from one of the first and second transmitters;

comparing the first ID signal received by the receiving step with a first registered signal;

rendering an engine operable when the first ID signal received by the receiving step is in agreement with the registered signal; and measuring an operation time of a manual device provided in a key, wherein the first ID signal is transmitted when the operation time is equal to or longer than a predetermined time length and the second ID signal is transmitted when the operation time is shorter than the predetermined time length.

27. An antitheft process as claimed in claim 26 wherein, when the manual device is operated, the second ID signal is transmitted, and thereafter the first ID signal is transmitted, and wherein the process further comprises a step of comparing the second ID signal with a second registered signal, and a step of enabling a door lock to be locked and unlocked if the second ID signal matches with the second registered signal.

* * * * *